United States Patent [19]

Justus

[11] Patent Number: 4,523,325
[45] Date of Patent: Jun. 11, 1985

[54] THREE-STAGE BINARY COINCIDENCE DETECTOR APPARATUS WITH ADAPTIVE CONSTANT FALSE ALARM RATE

[75] Inventor: Jimmie J. Justus, Yorba Linda, Calif.

[73] Assignee: The Unites States of America as represented by the Secretary of the Air Force, Washington, D.C.

[21] Appl. No.: 382,069

[22] Filed: May 26, 1982

[51] Int. Cl.³ ............................................. H03K 13/00
[52] U.S. Cl. .................................. 377/44; 343/5 CF;
328/115; 328/119; 307/362
[58] Field of Search .................. 377/28, 29, 44, 5 CF,
377/17.7; 343/5 CF; 455/296; 328/115, 119;
307/362

[56] References Cited

U.S. PATENT DOCUMENTS

| | | | |
|---|---|---|---|
| 3,797,014 | 3/1974 | Tompkins et al. | 343/5 CF |
| 3,838,422 | 9/1974 | McArthur et al. | 343/5 CF |
| 4,062,012 | 12/1977 | Colbert et al. | 343/5 CF |
| 4,249,177 | 2/1981 | Chen | 343/5 CF |

OTHER PUBLICATIONS

Radar Detection in Weilbull Clutter by D. C. Schleher, IEEE Transactions on Aerospace & Elec. Systems, vol. AES 12, No. 6, Nov. 1976.

A Coincidence Procedure for Signal Detection by Mischa Schwartz, IRE Transactions on Information Theory Mar./Dec. 1956.

*Primary Examiner*—John S. Heyman
*Assistant Examiner*—K. Ohralik
*Attorney, Agent, or Firm*—Donald J. Singer; William Stepanishen

[57] ABSTRACT

A target processor utilizing a feedback loop to maintain a constant false alarm rate for variable level video input signals with noise or noise plus clutter on the input signal. The processor includes three serially connected stages of binary coincidence detectors which comprise a threshold detector for processing video signals which exceed a threshold level, an M of N detector for providing an alarm for each range gate having a count of M or greater pulses, and a P of Q detector for generating a target alarm after at least P or greater frequencies have been transmitted.

6 Claims, 2 Drawing Figures

THREE-STAGE BINARY COINCIDENCE DETECTOR APPARATUS WITH ADAPTIVE CONSTANT FALSE ALARM RATE

STATEMENT OF GOVERNMENT INTEREST

The invention described herein may be manufactured and used by or for the Government for governmental purposes without the payment of any royalty thereon.

BACKGROUND OF THE INVENTION

The present invention relate broadly to coincidence detectors, and in particular to a three-stage binary coincidence detector apparatus with adaptive constant false alarm rate (CFAR).

In the prior art it is well known that a radar apparatus often is operated in an environment in which the limitation of its services results not only from the internal noise, but also from undesired echoes, such as for example, land or sea returns, the disturbing effect of rain clutter, etc. In order to distinguish the return which results from a target rather than from noise, it is possible to have recourse to a constant threshold, but the presence of undesired echoes, which may mask the useful signals, makes such a technique for discrimination unacceptable.

These drawbacks result substantially from the non-constancy of the probability of false alarm, can be seen in the radar systems using computers to handle the data relating to the target, as well as in those in which the decision regarding the presence or the absence of a useful echo, is given by an operator who decides on the basis of the visual representation. It is therefore of the greatest importance to overcome this drawback, to maintain constant the probability of false alarm.

In the prior art, spatially-varying clutter statistics and dense target environments impose difficult requirements on a conventional adaptive detector. The result is that the detector fails to maintain a constant false alarm rate as clutter statistics vary and also fails to accommodate target-to-target interference as target enters the CFAR block. There is a further problem for the conventional adaptive detector which fails to accommodate the target-to-target interference as targets pass through the clutter cells in the detector. The clutter cells are usually referred to as a CFAR block which forms the clutter avergage. When the target enters the CFAR block, the target signal will raise the clutter average and degrade the ability to detect the nearby target incidently located in the detection cell. The detection degradation due to the target interference has been found to be unacceptable especially if radar operates in very heavy target environments. To eliminate the above-mentioned problems for target detection, a unique three-stage binary coincidence detector apparatus is presented.

SUMMARY OF THE INVENTION

The present invention utilizes a serial signal processor to process range gated signals through a common channel which removes gain variations and adapts to variable background clutter to maintain a constant false alarm rate. The three serially connected stages of binary coincidence detectors comprise a threshold detector for processing video signals which exceed a threshold level, an M of N detector for providing an alarm for each range gate having a count of M or greater pulses, and a P of Q detector for generating a target alarm after at least P or greater frequencies have been transmitted.

It is one object of the present invention, therefore, to provide an improved three-stage binary coincidence detector apparatus with an adaptive constant false alarm rate.

It is another object of the invention to provide an improved three-stage binary coincidence detector apparatus with a common channel to remove gain variations in range gated signals.

It is another object of the invention to provide an improved three-stage binary coincidence detector apparatus to provide an integration improvement while adapting to a variable background clutter.

It is yet another object of the invention to provide an improved three-stage binary coincidence detector apparatus which maintains a constant false alarm rate that is independent of the input video.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
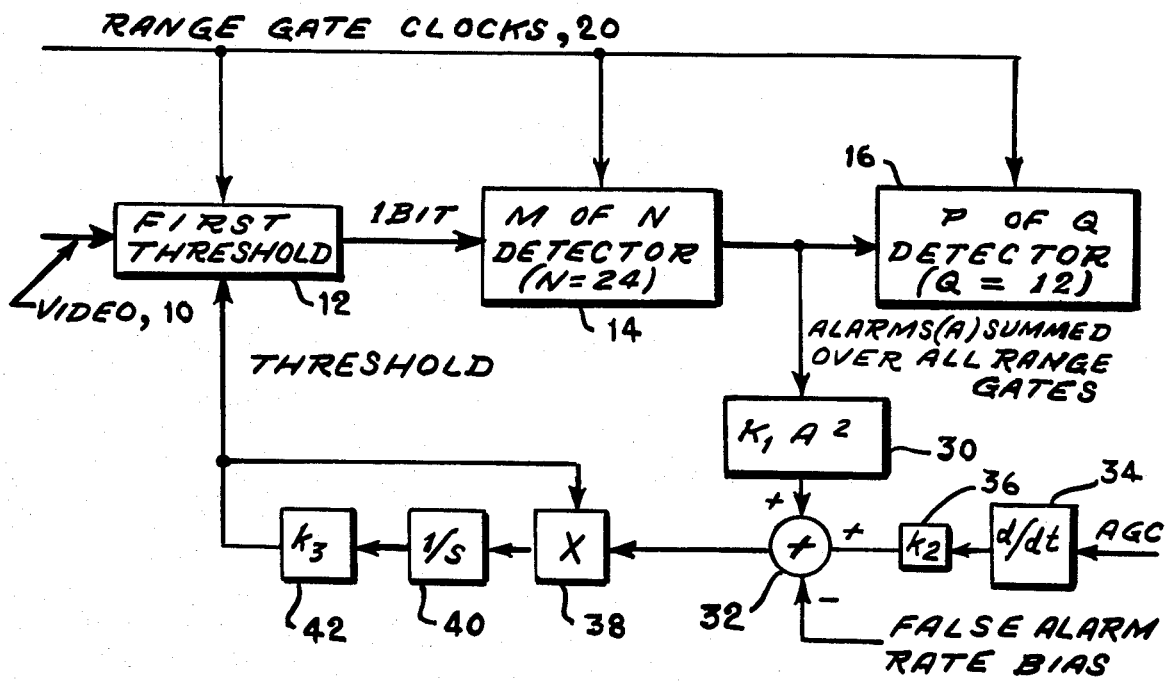
FIG. 1 is a block diagram of the three-stage binary coincidence detector apparatus according to the present invention.
Figure 2:
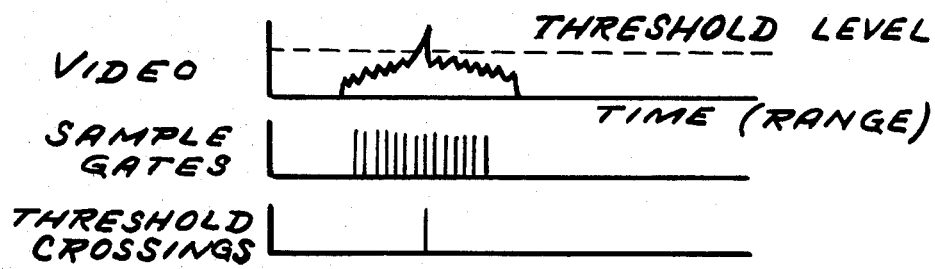
FIG. 2 is a graphical representation of signal waveforms in the three-stage binary coincidence detector apparatus.

Referring now to FIG. 1, there is shown a block diagram of a three stage binary coincidence detector apparatus wherein the input video signal 10 is applied to the first threshold unit 12. There is shown in FIG. 2, a typical waveform for the video signal 10. Range gate clocks 20 which are applied respectively to the first threshold unit 12, the M of N detector unit 14 and the P of Q detector unit 16, comprise a sample gates waveform that is shown in FIG. 2. The output of the first threshold unit 12 is a single digital bit for each threshold crossing that occurs therein. There is shown in FIG. 2, the threshold crossing which corresponds to the sampled portion of the typical video input signal wherein the threshold level was exceeded.

The M and N detector unit 14 which receives the output signal from the first threshold unit 12 is arranged to make N observations, where N as given in the present example is 24. The M of N detector unit 14 will output a logical bit signal to the P of Q detector unit 16 whenever a count of M or greater is achieved. The count M is equal to 5 and is approximately defined by the expression, $M = 1.5 \sqrt{N}$. The P of Q detector unit 16 which receives the output signal from the M of N detector unit 14, is arranged to make Q observations, where Q is given in the present example as 12. The P of Q detector unit 16 will output a target alarm whenever a count of P or greater is achieved. The alarm signal at the output of the M of N detector, A, is applied to a threshold feedback loop to adjust the threshold level in the first threshold unit 12 and thereby provide an adaptive constant false alarm rate (CFAR) function. In the P of Q detector unit 16, the count P which is equal to 4, is approximately defined by the expression, $P = \sqrt{Q}$.

The alarms signal A from the M of N detector unit 14 are applied to an amplifier unit 30 wherein the square of the alarm signal A, is multiplied by a constant factor $K_1$. A AGC signal which is derived from the video receiver (not shown) is applied to a differentiator unit 34. The output from the differentiator unit 34 is multiplied in amplifier unit 36 by a constant factor $K_2$ and is applied to summing unit 32. The summing unit 32 receives a false alarm rate bias signal which is fixed as well as the output from amplifier unit 30. The output from the summing unit 32 is applied through the threshold feedback loop elements to the first threshold unit 12. The feedback loop elements comprise a multiplier unit 38, an integrator unit 40 and an amplifier unit 42. The multiplier unit 38 receives the output signal from the summing unit 32 and multiplies it by a factor that is dependent upon the average signal level which is applied to the first threshold unit 12. The output signal from the multiplier unit 38 is integrated in integrator unit 40 and is applied to amplifier unit 42. The signal in amplifier unit 42 is amplified by a factor, $K_3$, and applied to the first threshold unit 12 to establish the threshold level therein.

The three-stage binary coincidence detector may be utilized in a typical radar system such as in a frequency agile radar seeker. The three-staged binary coincidence detector apparatus would operate in the following manner. The seeker radar transmits a train of N pulses at a constant transmitted frequency. After the train of N pulses, the transmitter unit shifts to a new discrete frequency. A total of Q frequencies are transmitted by the seeker radar. Range gated video levels which exceed the set threshold level of the first threshold unit 12, will produce a logic "1" at the M of N detector unit 14 input. After N pulse repetition intervals (PRI'S), the M of N detector unit 14 will output an alarm for each range gate which has a count of M or greater. Detections at the M of N detector unit 14 output are processed by the P of Q detector unit 16 to generate target alarms and by means of the feedback loop circuitry would generate a threshold level signal to control the false alarm rate. Decisions are provided by the M of N detector unit 14 every N pulse repetition intervals. The P of Q detector unit 16 performs a sliding window operation on the M of N detector outputs. A P of Q detector alarm is generated when alarms have occurred on at least P of the previous Q observations of the M or N detector unit 14 outputs. The quantities M and P are selected to give the best combination of detection performance and constant false alarm rate operation for the given application. The values of M and P in the present typical example seeker radar are 8 and 5, respectively. The constant false alarm rate circuit constantly adjusts the threshold voltage level such that a target alarm due to receiver noise is produced at a rate of approximately one per minute. The constant false alarm rate circuit is entirely adaptive and self-normalizing by virtue of the output feedback loop. The threshold voltage is proportional to the square of the number of range bits having alarms to provide rapid response to increasing clutter level. Changes in automatic gain control (AGC) level are also sensed to compensate the constant false alarm rate threshold for receiver gain changes.

Although the invention has been described with reference to a particular embodiment, it will be understood to those skilled in the art that the invention is capable of a variety of alternative embodiments within the spirit and scope of the appended claims.

What is claimed is:

1. A three-stage binary coincidence detector apparatus with an adaptive constant false alarm rate comprising in combination:
   a threshold means for establishing a first threshold level, said threshold means receiving a video signal, said threshold means receiving a range gate clock signal, said threshold means sampling said video signal at said range gate clock signal rate, said threshold means providing a logical output for each range gated video level that exceeds said first threshold level,
   a first counter for counting a first predetermined number of digital bits, said first counter receiving said logical output from said threshold means, said first counter means having a first predetermined binary length, said first counter recieving said range gate clock signal, said first counter providing a binary bit output every time said first predetermined number is exceeded,
   a second counter for counting a first predetermined number of binary bits, said second counter receiving said binary bit output from said first counter, said second counter having a second predetermined binary length, said second counter receiving said range gate clock signal, said second counter providing an alarm signal when said first predetermined number of binary bits is either equalled or exceeded, and,
   a threshold feedback loop connected between said first and second counters to said threshold means, said threshold feedback loop receiving a false alarm rate bias signal and an AGC signal, said threshold feedback loop receiving said alarm signal from said first counter, said threshold feedback loop providing a threshold set signal to said threshold means.

2. A three-stage binary coincidence detector apparatus as described in claim 1 wherein said first counter comprises an M of N detector in which N represents the binary length of said M of N detector and M represents the number of counts to be equalled or exceeded to provide a binary bit output.

3. A three-stage binary coincidence detector apparatus as described in claim 1 wherein said second counter comprises a P of Q detector in which Q represents the binary length of said P of Q detector and P represents the number of counts that must be equalled or exceeded to provide an alarm signal.

4. A three-stage binary coincidence detector apparatus as described in claim 1 wherein said threshold feedback loop comprises:
   an amplifier connected to said first counter to amplify said alarm signal by a constant factor, said amplifier providing an alarm rate signal,
   a summing means receiving said alarm rate signal from said amplifier, said summing means receiving an AGC bias which is proportional to said AGC signal and a false alarm rate bias, said summing means providing a threshold signal, and,
   a threshold level adjust means connected to said summing means to receive said threshold signal, said threshold level adjust means processing said threshold signal to provide a threshold set signal.

5. A three-stage binary coincidence detector apparatus as described in claim 2 wherein N is equal to 24 bits and M is equal to 8 bits.

6. A three-stage binary coincidence detector apparatus as described in claim 3 wherein Q is equal to 12 bits and P is equal to 5 bits.

* * * * *